United States Patent Office 3,409,455
Patented Nov. 5, 1968

3,409,455

PROCESS OF REPRODUCTION ON BENZENE DIAZONIUM FLUOBORATE SHEET BY HEAT EXPOSURE

Bernard I. Halperin, Glen Aubrey, N.Y., assignor to GAF Corporation, a corporation of Delaware No Drawing. Filed Jan. 4, 1965, Ser. No. 423,297
3 Claims. (Cl. 117—1.7)

ABSTRACT OF THE DISCLOSURE

Photographic reproduction process involving imagewise exposure to heat of a material sensitized with a heat-sensitive but relatively ultraviolet-insensitive benzene diazonium fluoborate, and developing by treatment with an azo coupler in alkaline environment.

The present invention is related to a novel process for photographic reproduction which makes use of diazonium salts and couplers. In particular, it makes use of heat sensitive diazonium salts and couplers for the reproduction of images. In addition, it describes the manufacture of new articles which make use of this photographic concept.

The principles of photographic reproduction which make use of various combinations of diazonium salts and couplers are well known. In this process actinic radiations are employed for image differentiation. When such radiation impinges upon a diazonium salt, the latter is decomposed to nitrogen and a degenerate compound or compounds. Diazonium salts which are not irradiated in this manner are capable of reaction with certain compounds possessing active hydrogen sites to form azo dyes.

Such coupling or azo dye formation which transforms a hardly visible yellow color to an intensely colored dye usually takes place under alkaline conditions. Obviously, such a reaction is impossible if there is no azo linkage available. In commercial practice, a substrate bearing the diazonium salt and a coupling component is exposed to ammonia vapors to cause dye formation. Or, in another version of this process, the substrate bearing only the diazonium salt is passed through a machine which applies an alkaline solution containing coupling components. In this manner the resultant dye is formed.

In the conventional diazotype process, opaque originals cannot be duplicated since they do not allow the transmission of any ultraviolet radiation. Only a translucent or transparent original can be employed. In ordinary practice, the original is placed above the paper coated with the diazonium salt. This combination is then exposed to actinic radiation. Where the original contains an opacifying material, i.e., ink or printing, the radiations are blocked. In the clear areas these radiations penetrate through the original and destroy the diazonium salt on the surface of the sheet beneath. The diazotype sheet is then processed in an alkaline environment as described above to yield a copy of the original.

The procedure described above may also be varied according to the teachings of the prior art. Negative images may be produced from a translucent or transparent original. In this process a diazosulfonate compound is employed as the light-sensitive material. This diazosulfonate is inactive to coupling media unless and until it has been irradiated with ultraviolet radiation. The exposure to such radiation causes only the irradiated areas beneath an original to become the potential dye forming areas. Unexposed areas do not form dyes by coupling. This is just the reverse of the process described above. The areas beneath the ultraviolet opaque material are, of course, unaffected by the exposure. Hence by subjecting the sheet which has been so exposed to an alkaline environment in the presence of a suitable coupler an azo dye image is formed. However, this negative system must, according to the prior art, be subjected to a further step of rinsing with water. This is necessary to remove the unirradiated diazosulfonate. If not removed, this material which is still active could form a dye and ruin the reproduction.

The system just described above for producing negatives obviously has its disadvantages. It requires the washing step in addition to the subjection to ammonia fumes or other alkaline environment. Also, it cannot be used to reproduce opaque originals.

According to the present invention, the disadvantages recited above may be overcome by a simple system for producing negatives, even from opaque originals, using the diazonium salt principle.

Thus, according to the present invention, by the selection of certain diazonium salts which are relatively insensitive to the ultraviolet and near ultraviolet radiations of the spectrum, but which are heat sensitive, an improved and simpler process is made available. The use of expensive ultraviolet light sources can be avoided as well as the undesirable step of washing after coupling to form the dye. Hence, several advantages are derived by the present system.

In addition, as may be inferred from the above discussion, the system of the present invention does not depend upon the use of translucent or transparent originals. The requirement that the original be translucent or transparent obviously is a serious limitation on the use of the diazo type system as used conventionally in prior art practice. The reproductive media or materials and the processes of the present invention are capable of use for reflex exposure as well as by transmission of the activating radiation.

The reproduction, according to the present invention, depends upon direct physical contact of the reproducing medium with an original to be copied having image forming areas which are relatively absorptive of heat generating radiation (primarily infrared radiation) and background areas which reflect or transmit such radiation with relatively low absorption thereof.

According to the present invention, then, when it is desired to make a negative of a transparent or translucent positive original, the original is placed above the reproducing or copy sheet which contains a heat-sensitive diazonium salt which is not very sensitive to the ultraviolet end of the spectrum. Such salts are benzene diazonium fluoborates wherein the benzene ring is otherwise unsubstituted or contains such substituents as methyl, methoxy, or phenyl. The assembled sheets are then exposed to heat-generating or infrared radiation. The opaque and dark colored image, for example, printed matter such as, typographic material, type written data, etc., absorbs the heat-generating radiation and transmits the absorbed heat by conduction to the adjacent sheet containing the heat-sensitive diazonium salt layer. The transmitted heat decomposes the heat-labile diazonium salt in the image areas.

Thereafter, the reproduction or copy sheet is exposed to an alkaline environment, e.g., of ammonia fumes, as in the conventional diazonium process, and to an azo coupler. The latter may be included in the light-sensitive layer together with acid stabilizers against premature coupling, or applied with an alkaline developer. This procedure results in production of a negative image of the positive original. The diazonium salts unaffected by the heat will couple to form a dye. In heat-exposed areas in which the diazonium salt is destroyed, no dyestuff is formed.

In case it is desired to produce a reflex image from an opaque original, the diazonium salt layer of the sensitized sheet, which is of material, (such as paper) transmitting infrared radiation with relatively little absorption, is placed over and in contact with the surface of the original. It is then exposed to heat-generating infrared radiation, which passes through the copy sheet and impinges upon the printed area of the original where the rays are absorbed and the clear areas where they are not absorbed. The image portions of the original are heated by absorption of the radiation, and the resultant heat decomposes the diazonium salt of the reproduction sheet in those areas in contact with the image portions of the original, thus rendering them incapable of dye formation. By subjecting the exposed sheet to an alkaline environment, as before, e.g., to treatment with ammonia vapor in the presence of a suitable coupler, a reflex negative image will be formed on the copy sheet.

The invention will be more clearly understood by reference to the following specific examples:

Example 1

A sheet of paper was coated with the following solution:

| | |
|---|---|
| Sodium 6,7-dihydroxy-2-naphthalene sulfonate grams | 3 |
| Citric acid do | 5 |
| Benzenediazonium fluoborate do | 2 |
| Water to bring the total to cc | 100 |

After the coating was applied, the sheet was allowed to dry. Thereafter the coated sheet was exposed to heat-generating radiation under an original having a pattern such as typing which is relatively absorptive of such radiation and a background such as paper which is transmissive or reflective of the radiation. Alternatively, the coated sheet is placed with its coated surface in contact with the original, and irradiated through its rear surface with infrared radiation. The coated sheet is then developed by exposure to ammonia. A chocolate brown image is formed in each case.

Example 2

The following solution is coated on a 20½ lb. paper at 86 ft. per minute and doctored with an airknife:

| | |
|---|---|
| Sodium 6,7-dihydroxy-2-naphthalene sulfonate grams | 3 |
| 5-sulfosalicylic acid do | 5 |
| p-Toluene diazonium fluoborate do | 2 |
| Water to cc | 100 |

The dried coating is exposed and developed as in Example 1. A brown negative image is obtained. If resorcinol is substituted for sodium 6,7-dihydroxy-2-naphthalene sulfonate, an orange negative image is obtained.

Example 3

The following solution is coated in the same manner as in Example 2:

| | |
|---|---|
| Sodium 6,7-dihydroxy-2-naphthalene sulfonate grams | 3 |
| 5-sulfosalicylic acid do | 5 |
| p-Methoxybenzenediazonium fluoborate do | 2 |
| Water to cc | 100 |

The dried coating is exposed and developed as in Example 1. A wine colored negative image is obtained. Substitution of resorcinol as noted in the preceding example yields a negative orange image.

Example 4

The following solution is coated in the same manner as in Example 2:

| | |
|---|---|
| Sodium 6,7-dihydroxy-2-naphthalene sulfonate grams | 3 |
| 5-sulfosalicylic acid do | 5 |
| 4,4′-biphenyl bis(diazonium fluoborate) do | 2 |
| Water to cc | 100 |

The dried coating is exposed and developed as in the preceding examples. A blue colored negative image is obtained. Substitution of resorcinol as in Examples 2 and 3 yields a light orange-yellow image.

In lieu of diazonium fluoborates of the examples, other heat-labile diazonium salts may be substituted. It should be emphasized that the salts must be of the heat-sensitive type and should be relatively insensitive to radiation at the other end of the visible spectrum, i.e., to ultraviolet.

Obviously, other coupling agents may be used, as is well known in the art; these coupling agents are of the same types as are used for conventional diazonium compounds designed for ultraviolet type exposure and development. Likewise, the various conventional means for alkali treatment may be used such as moistening with an aqueous solution of an alkaline reacting salt or base, e.g., sodium borate, sodium carbonate, ammonium hydroxide, ethanolamine.

There are, of course, many processes in the prior art for developing images by the use of infrared radiation, taking advantage of the differential adsorption of heat of the black or dark coated areas of an original to transmit heat to the recording sheet. Therefore, this principle of transferring images by direct transfer of heat absorbed from infrared radiation is not claimed broadly. However, the use of the diazonium type dyes, which are particularly sensitive to heat radiation, in conjunction with conventional development procedures typical of diazonium processes, characterizes the present invention.

What is claimed is:

1. A process for photographic reproduction which comprises coating a reproduction sheet with a benzene diazonium fluoborate which is sensitive to heat and relatively insensitive to ultraviolet radiation, placing an original having image areas which are relatively absorptive and background areas which are relatively non-absorptive to infrared radiation, in physical contact with said coated sheet, exposing the sheet to infrared radiation to cause heating of the image portions of the original, thereby causing differential decomposition of the heat-labile diazonium salt in the area of the reproduction sheet adjacent the image areas, of said original, thereafter exposing the coated sheet to an alkaline environment and a coupler to produce a negative image of the positive original.

2. The method of producing images from opaque originals which comprises coating a reproduction sheet with a benzene diazonium fluoborate sensitive primarily to heat, placing said coated sheet over an original having image areas which are relatively absorptive and background areas which are relatively non-absorptive to infrared radiation, exposing the combined sheets to infrared radiation passing through the coated sheet to impinge upon the original and heat up the image portions of said original by heat absorption, thereby causing decomposition of the diazonium salt in the area of the reproduction sheet adjacent the image areas of said original, and developing a negative reproduction by subjecting the reproduction sheet to an alkaline environment in the presence of a coupler.

3. The process of reproduction of an original containing an infrared absorbing image, which comprises coating a reproducing sheet with a sensitizing solution comprising an azo coupler, an acid stabilizer against premature coupling and a heat sensitive benzenediazonium fluoborate which is relatively insensitive to ultraviolet radiation, drying said coating, placing the original in direct physical contact with the coated sheet, exposing the sheets thus assembled to infrared radiation to thereby decompose the fluoborate compound in the reproduction sheet in the areas adjacent to the image areas of the original, and developing a copy of the image on the reproducing sheet by exposure to an alkaline environment.

References Cited

UNITED STATES PATENTS

| | | | |
|---|---|---|---|
| 2,095,408 | 10/1937 | Hendrik de Boer et al. | 96—49 |
| 3,064,049 | 11/1962 | Cox | 96—91 X |
| 3,113,025 | 12/1963 | Bialczak | 96—49 |
| 3,191,030 | 6/1965 | Huett et al. | 250—65.1 |
| 3,196,029 | 7/1965 | Lind | 117—37 X |
| 3,203,798 | 8/1965 | Muller | 96—49 |
| 3,224,878 | 12/1965 | Klimkowski et al. | 96—49 |
| 3,255,011 | 6/1966 | Welch | 96—49 |
| 3,256,811 | 6/1966 | Bach | 117—1.7 X |
| 3,294,534 | 12/1966 | Halperin | 96—49 |
| 3,309,200 | 3/1967 | Berman et al. | 96—49 |

OTHER REFERENCES

Saunders, K. H.: "The Aromatic Diazo-Compounds and Their Technical Applications," Edward Arnold & Co., 1949, pp. 80–81.

WILLIAM D. MARTIN, *Primary Examiner.*

E. J. CABIC, *Assistant Examiner.*